Figure 5:
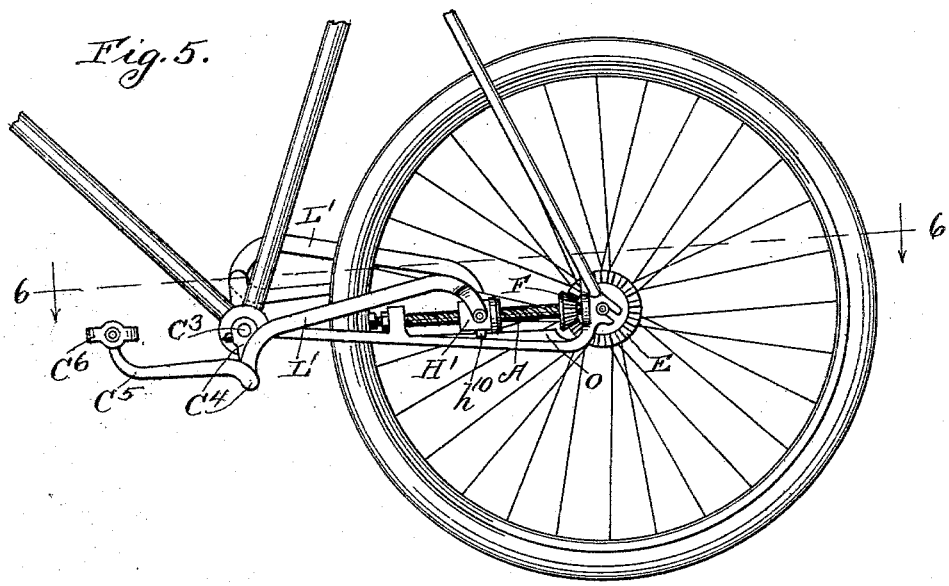

(No Model.) 2 Sheets—Sheet 1.
W. H. RUSSELL.
CHAINLESS BICYCLE.
No. 597,621. Patented Jan. 18, 1898.
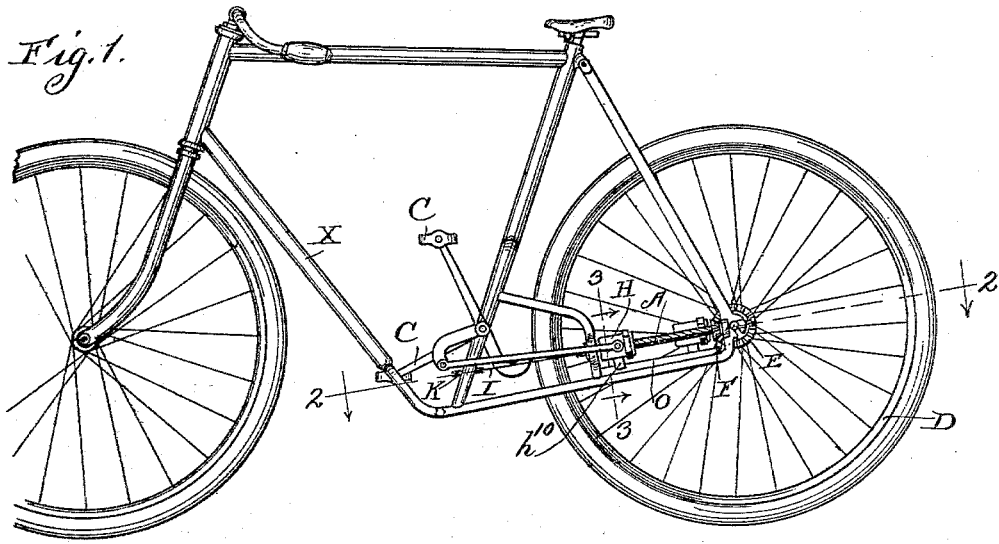
Fig. 1.
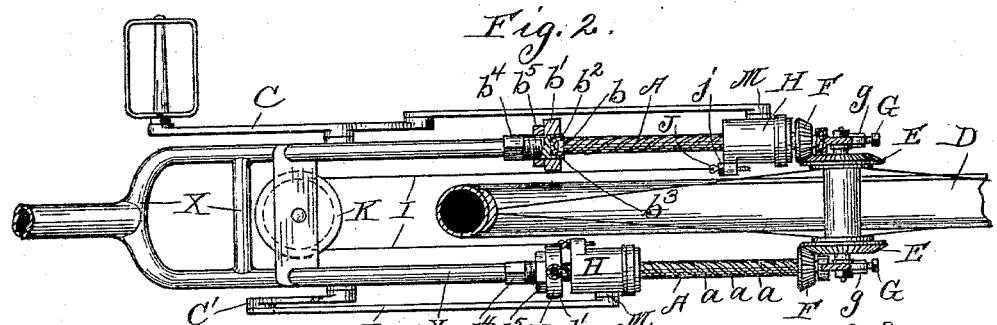
Fig. 2.
Fig. 3.
Fig. 4.
Witnesses:
W. J. Jacker.
Eleonora Fensner.
Inventor:
William H. Russell,
By Brown & Brown
Attys.
THE NORRIS PETERS CO., PHOTO-LITHO., WASHINGTON, D. C.

(No Model.) 2 Sheets—Sheet 2.

W. H. RUSSELL.
CHAINLESS BICYCLE.

No. 597,621. Patented Jan. 18, 1898.

Witnesses:
W. J. Jacker
Eleonora Ferusner

Inventor:
William H. Russell,
By Brown & Brown,
Attys.

THE NORRIS PETERS CO., PHOTO-LITHO., WASHINGTON, D. C.

UNITED STATES PATENT OFFICE.

WILLIAM H. RUSSELL, OF CHICAGO, ILLINOIS.

CHAINLESS BICYCLE.

SPECIFICATION forming part of Letters Patent No. 597,621, dated January 18, 1898.

Application filed February 17, 1897. Serial No. 624,205. (No model.)

*To all whom it may concern:*

Be it known that I, WILLIAM H. RUSSELL, a resident of Chicago, in the county of Cook and State of Illinois, have invented certain new and useful Improvements in Chainless Bicycles, of which the following, when taken in connection with the drawings accompanying and forming a part hereof, is a full and complete description, sufficient to enable those skilled in the art to which it pertains to understand, make, and use the same.

My invention relates to chainless bicycles—that is to say, bicycles wherein the mechanism with which the foot or hand of the person riding and driving it is in contact is connected to the driven wheel of the bicycle (or other vehicle) by connections other than a chain extending over sprocket-wheels; and the object of my invention is to obtain a chainless bicycle wherein either a bell-crank having a pedal attached to one of the arms thereof can be moved to and from a given position by the foot or hand of the driver, the bicycle being thereby propelled, or a rotatable shaft or axle having crank-arms thereon, with a pedal or handle thereon, can be rotated and the bicycle propelled, or a combination of levers forming what is known as a "knuckle-joint" can be used, and a pedal on one of such levers between the fulcrumed end thereof and the end joined to its complementary lever, can be employed for driving such bicycle; and a further object of this invention is to obtain such connection between the mechanism moved, as described, by the person riding the machine and the driven wheel of such machine as to avoid friction as far as possible (and consequent loss of power) and to obtain the greatest forward motion in the machine for the least movement on the part of the person driving it consistent with perfect control of the machine.

The manner in which I reduce my invention to practice is well illustrated in several constructions contained in the drawings hereinbefore referred to, in which—

Figure 6:
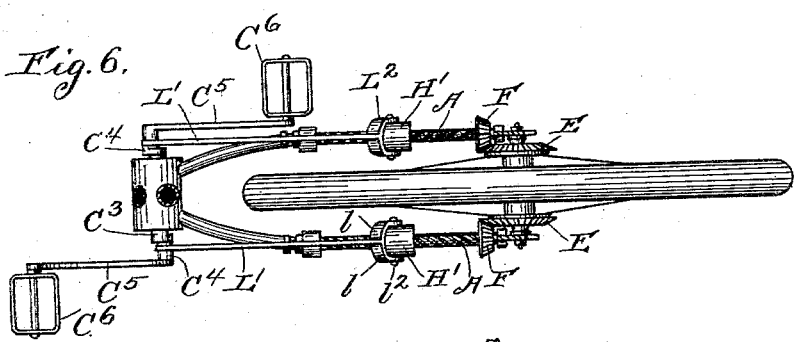
Figure 7:
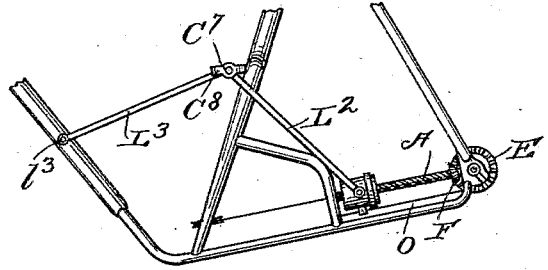

Figure 1 is a side elevation of a bicycle having bell-crank pedals connected to a sliding sleeve mounted on a spiral shaft, such shaft geared to the rear wheel of a bicycle; Fig. 2, a horizontal sectional view of the construction illustrated in Fig. 1; Fig. 3, a vertical sectional view on line 3 3 of Fig. 4, viewed in the direction indicated by the arrows, of the sliding sleeve on the spiral shaft illustrated in Figs. 1 and 2; and Fig. 4, a longitudinal sectional view of such sleeve on line 4 4 of Fig. 3, viewed in the direction indicated by the arrows. Fig. 5 is an elevation of a modification of the embodiment of my invention illustrated in Figs. 1 to 4; Fig. 6, a horizontal sectional view of such modification on line 6 6 of Fig. 5, viewed in the direction indicated by the arrows; and Fig. 7 is an elevation of another modification.

A reference-letter applied to indicate a given part is used to designate such part throughout the several figures of the drawings wherever the same appears.

In the construction illustrated in Figs. 1 to 4, both inclusive, the ordinary diamond frame is changed in its outlines and construction; but such change forms no material part of this invention, having been previously shown by me in prior applications for Letters Patent. Such frame, however, is by me deemed best adapted and arranged to admit the placing thereon of a bell-crank for actuating the sleeve on the spiral shaft.

A is a spiral shaft mounted in ball-bearings on frame X of the bicycle.

B B are the ball-bearings of spiral shaft A.

$a\ a\ a\ a$ are the spirals on spiral shaft A. By varying the pitch of the spirals $a\ a\ a\ a$ the speed of the machine (in comparison with the speed of movement of pedals C) is varied.

In Fig. 2 of the drawings a horizontal sectional view of one of the ball-bearings B B is given, and it will be observed that the spiral may have a cone $b$ on the end thereof, and the standard $b'$ may have a cup $b^2$ fitted therein, with balls $b^3\ b^3$ interposed between the cup and cone, and a bolt $b^4$, having a jam-nut $b^5$ thereon, may be screwed into the standard $b'$. The adjustment of the ball-bearings B is obtained by means of bolt $b^4$ and maintained by tightening jam-nut $b^5$ in the ordinary way.

D is the rear wheel of a bicycle, and E E are beveled gear-wheels rigidly secured to the hub of wheel D.

F F are beveled gear-wheels intermeshing with the beveled gear-wheels E E, respectively, such gear-wheels F F being rigidly mounted on the respective spiral shafts A A.

G G are bolts having jam-nuts $g\ g$ thereon, respectively, by means of which the proper adjustment of the beveled gear-wheels E and F is obtained and maintained.

H is a sliding sleeve mounted on the shaft A to be moved longitudinally thereon. Each of the shafts A A has a sliding sleeve H thereon, the sleeve on one of the shafts A being so connected to the sleeve on the other shaft that when one of such sleeves is moved in one direction the other one thereof will be moved on its shaft in the other direction. Where the pedals of a bicycle are secured on a rotatable shaft or axle, as in Figs. 5 and 6 of the drawings, such connection between the sleeves on the respective shafts A A is obtained through the connections between the sleeves and the pedals, respectively; but where the bell-crank pedals C C (shown in Figs. 1 and 2) are used and such bell-crank pedals are mounted independently in the frame X of the bicycle the sleeves must be connected together by means other than the connections from such sleeves to such pedals, and in such case I prefer to employ a flexible connection I, adjustably secured by means of adjusting-bolt J to the sleeves H at its ends and extending around rotatably-mounted grooved wheel K.

$j$ is a jam-nut on bolt J, by which such bolt is maintained in its adjusted position. Bolts J J on sleeves H H, respectively, are so adjusted that flexible connection I will remain in position on the grooved wheel K, such flexible connection not being sufficiently taut to interfere in any way with the proper reciprocal movement of the sleeves H H.

L L are connections between the bell-cranks C C, respectively, and the respective sliding sleeves H H. Connections L L are secured, respectively, to the arms C' C' of bell-cranks C C and to abutment M on sleeves H H by an ordinary pivot, with balls interposed, when preferred, between the pivot and the connection mounted thereon.

The construction of the sliding sleeves H H forms a material part of my invention and is as follows:

$h$ is a cylinder fitting loosely on spiral shaft A and having therein holes or perforations $h'$ $h'$ $h'$ $h'$ at each end thereof. The number of such perforations corresponds with the number of spirals $a$ $a$ $a$ $a$ on the spiral shaft, and in each of such perforations there is placed a ball N, engaging with one of the spirals of shaft A.

$h^2$ is a cylinder fitting closely over the cylinder $h$, so that when placed in position such cylinders $h$ $h^2$ constitute a single cylinder having pockets for the reception of balls on the inside thereof—that is, on the part adjacent to spiral shaft A—such pockets being formed by the holes or apertures or perforations $h'$ $h'$ $h'$ $h'$. Cylinders $h$ $h^2$ (or the compound cylinder formed by the putting together of such cylinders) have cones $h^3$ $h^3$ at the ends thereof and ratchet P or its equivalent around the outer or peripheral surface thereof, and such cylinders fit loosely in cylinder $h^4$, with a ball-bearing interposed in such manner that the inner cylinders may rotate with but little friction, if any, in the cylinder $h^4$. $h^5$ $h^5$ are the balls so interposed. To properly adjust the ball-bearings between cylinders $h$ $h^2$ (or the compound cylinder formed by them) and the cylinder $h^4$, the cap $h^6$ is fitted to one end of the cylinder $h^4$ by means of corresponding screw-threads $h^7$ $h^8$, and such cap is maintained in its adjusted position by the jam-nut $h^9$.

In the operation of the bicycle embodying my invention the sleeves H H are alternately moved reciprocally on the spiral shaft A by the movement of the pedals of the machine through the connections L L, respectively, and in one of the reciprocal movements of such sleeve H the inner cylinders $h$ $h^2$ may rotate—that is, on the return movement thereof—while in the other of such reciprocal movements neither the cylinder $h^4$ nor the cylinders $h$ $h^2$ can rotate. To prevent the rotation of the cylinder $h^4$, I prefer to put the rib O on the bicycle-frame, with projections $h^{10}$ $h^{10}$ on cylinder $h^4$ and balls Q Q interposed between the projections and the rib, and to prevent the rotation of the inner cylinders in one of the longitudinal movements of the sleeve H, I prefer to have the pawl or dog R in cylinder $h^4$ engaging with the ratchet P on cylinder $h^2$, although I do not limit myself to rib O, with projections $h^{10}$ $h^{10}$, or to the pawl R and ratchet P, as it is evident that other constructions the equivalent of those described may be substituted therefor.

The reciprocal movement of the pedals of the bicycle produces by means of connections L L and the connection between the respective sleeves H H reciprocal movement of such sleeves, and as the sleeves move in one direction the spiral shafts A A will be rotated by the balls N N N N interposed between the spiral shaft and the sleeves, as such balls follow the course of the spirals $a$ $a$ $a$ $a$ because of the non-rotation of the sleeve H or any of the parts thereof, while the movement of such sleeve in the opposite direction to that last above referred to will not rotate the shaft A, because the inner cylinders $h$ $h^2$ rotate on balls $h^5$ $h^5$ $h^5$ $h^5$, as hereinbefore described, and as the forward motion of the bicycle causes continued rotation of the spiral shafts, respectively, while the respective sleeves are moving in what may properly be termed the "return movements" thereof, the inner cylinders $h$ $h^2$ may be turned by such shaft therewith.

The modifications illustrated in Figs. 5 and 6 are made as follows: Crank-shaft $C^3$ is mounted in the ordinary manner on ball-bearings of any desired construction. Cranks $C^4$ $C^4$ are rigidly secured thereon, and connections L' L' extend from such cranks to sleeves H'. Connections L' are pivotally attached to the sleeves H' H', respectively, being forked—that is, having arms $l$ $l'$ extending on opposite sides of the sleeves to the pivots $l^2$. From the cranks $C^4$ $C^4$, respectively, there extend cranks $C^5$ $C^5$, having pedals $C^6$ on the outer end thereof. Pedals $C^6$ are set on the quarter, to the point of pivotal attachment of connections L' L', so that as the pedals $C^6$ $C^6$, respectively, in descending or ascending, pass through the horizontal plane in which the center of axis $C^3$ extends, the pivotal point of attachment of connections L' L' to cranks $C^4$ $C^4$ will pass through the perpendicular plane of the center of such axis. By this construction the sleeve H' will be midway of its horizontal movement when the pedals $C^6$ $C^6$, respectively, are midway of their upward and downward movement, as is shown by the position of such parts in Figs. 5 and 6 of the drawings. Sleeves H' H' are constructed in the same manner as are sleeves H H, excepting that means for pivotally securing arms $l$ $l'$ of connection L' on both sides of sleeves I', as by pivots $l^2 l^2$, are substituted for the means provided in sleeve H to pivotally secure connection L to one side thereof, and hence no detail description of such sleeves H' H' is required. The beveled gear E is rigidly secured to the hub of the rear wheel of the bicycle in this construction illustrated in Figs. 5 and 6 in the same way as in the construction illustrated in Figs. 1 and 4, and beveled gears F F are rigidly secured to spiral shafts A A, respectively, and I therefore retain in this modification the same lettering for such parts.

In the modification illustrated in Fig. 7 levers $L^2$ $L^3$ are pivotally connected together at $C^7$, (the point of attachment of pedal $C^8$,) lever $L^3$ being pivotally attached to the frame X at $I^3$ and lever $L^2$ being pivotally attached to sleeve H' at $l^2$ in the same manner as levers L' are connected to sleeves H' H' in the construction illustrated in Figs. 5 and 6.

The operation of the bicycle embodying my invention is as follows: The pedals being actuated by the feet of the person riding the machine, the sleeves on the respective spiral shafts are reciprocally moved on such shafts. In one of the movements of such sleeves the spiral shafts, on which such sleeves are mounted, are forced round in the ordinary way of rotating a spiral shaft by moving a sleeve longitudinally thereon. The balls N N N N being the connecting element between the shafts and the sleeves, the friction ordinarily produced is obviated. On what may be termed the "return movement" of the respective sleeves, the inner cylinders $h$ $h^2$ rotate on balls $h^5$ $h^5$ $h^5$ $h^5$ $h^5$ in the cylinder $h^4$, a ratchet and pawl P R fitting therein.

Having thus described my invention, what I claim as new, and desire to secure by Letters Patent, is—

1. In a vehicle, the combination of a spiral shaft mounted in ball-bearings to the frame of a vehicle, a sliding sleeve on the spiral shaft, such sleeve comprising a cylinder fitting loosely over the spiral shaft and having holes therethrough corresponding with the threads on the spiral shaft, a second cylinder fitting closely to the first-named cylinder, balls in the pockets formed by the holes in the first-named cylinder engaging with the threads on the spiral shaft, and an outer cylinder, with ball-bearings interposed between it and the inner cylinders, and means for moving the sleeve reciprocally on the spiral shaft; substantially as described.

2. In a vehicle, the combination of a spiral shaft mounted in ball-bearings to the frame of the vehicle, a sliding sleeve on the spiral shaft, such sleeve comprising a cylinder fitting loosely over the spiral shaft with holes in the cylinder corresponding with the threads on the spiral shaft, a second cylinder fitting closely over the first-named cylinder, balls in the pockets formed by the holes in the first-named cylinder, an outer cylinder, ball-bearings interposed between the outer cylinder and the cylinders containing the balls, a connection between the outer cylinder and the inner cylinders whereby such inner cylinders may revolve in one direction independently of the outer cylinder, and means for moving the sleeve longitudinally; substantially as described.

3. In a vehicle, the combination of a spiral shaft mounted in ball-bearings to the frame of the vehicle, a sliding sleeve on the spiral shaft, such sleeve comprising a cylinder fitting loosely over the spiral shaft and having holes therein corresponding with the threads on the spiral shaft, a second cylinder fitting closely over the first-named cylinder, balls in the pockets formed by the holes in the first-named cylinder, an outer cylinder and a ball-bearing interposed between the outer cylinder and the inner cylinders, a ratchet and pawl fitting thereinto between such outer cylinder and the inner cylinders, and means for moving the sleeve longitudinally on the spiral shaft; substantially as described.

4. In a bicycle having a spiral shaft with a gear thereon engaging with a corresponding gear on the driving-wheel of the bicycle and a sleeve mounted on the spiral shaft to move reciprocally thereon and rotate the same when the sleeve is moved in one direction, the combination thereof with a crank-shaft, cranks on the shaft, connections between the cranks and the reciprocally-movable sleeves, and cranks extending outward from the first-named cranks on the outside of the connections, with pedals on the last-named cranks, such pedal-cranks having the pedals thereon at an angle of ninety degrees from the connection-cranks; substantially as described.

WILLIAM H. RUSSELL.

In presence of—
CHARLES TURNER BROWN,
ELEONORA FERNSNER.